(12) United States Patent
Shaposhnik

(10) Patent No.: US 9,219,937 B2
(45) Date of Patent: Dec. 22, 2015

(54) UNIVERSAL MULTIPLEXER FOR CONTENT CHANNELS VIA INJECTING

(71) Applicant: Yona Shaposhnik, West Bloomfield, MI (US)

(72) Inventor: Yona Shaposhnik, West Bloomfield, MI (US)

(*) Notice: Subject to any disclaimer, the term of this patent is extended or adjusted under 35 U.S.C. 154(b) by 45 days.

(21) Appl. No.: 14/152,738

(22) Filed: Jan. 10, 2014

(65) Prior Publication Data

US 2014/0196067 A1    Jul. 10, 2014

Related U.S. Application Data

(60) Provisional application No. 61/750,910, filed on Jan. 10, 2013.

(51) Int. Cl.

| | |
|---|---|
| *H04N 7/16* | (2011.01) |
| *H04N 21/422* | (2011.01) |
| *H04N 21/414* | (2011.01) |
| *H04N 21/45* | (2011.01) |
| *H04N 21/462* | (2011.01) |
| *H04N 21/478* | (2011.01) |
| *H04N 21/81* | (2011.01) |

(52) U.S. Cl.
CPC ... *H04N 21/42208* (2013.01); *H04N 21/41407* (2013.01); *H04N 21/42202* (2013.01); *H04N 21/4532* (2013.01); *H04N 21/4622* (2013.01); *H04N 21/47815* (2013.01); *H04N 21/812* (2013.01)

(58) Field of Classification Search
CPC combination set(s) only.
See application file for complete search history.

(56) References Cited

U.S. PATENT DOCUMENTS

| | | | |
|---|---|---|---|
| 8,166,474 B1 | 4/2012 | Delco et al. | |
| 8,301,874 B1 | 10/2012 | Heidingsfeld et al. | |
| 2003/0140244 A1* | 7/2003 | Dahan et al. | 713/200 |
| 2007/0106986 A1* | 5/2007 | Worley, Jr. | 718/1 |
| 2008/0028400 A1 | 1/2008 | Taillefer et al. | |
| 2009/0125902 A1 | 5/2009 | Ghosh et al. | |
| 2010/0070725 A1 | 3/2010 | Prahlad et al. | |
| 2010/0169881 A1 | 7/2010 | Silvera et al. | |
| 2011/0093902 A1* | 4/2011 | De Los Reyes et al. | 725/80 |
| 2011/0239268 A1 | 9/2011 | Sharp et al. | |
| 2012/0151481 A1 | 6/2012 | Kang et al. | |
| 2013/0239145 A1* | 9/2013 | Broome et al. | 725/41 |
| 2013/0247117 A1* | 9/2013 | Yamada et al. | 725/93 |

* cited by examiner

*Primary Examiner* — Chenea Smith
(74) *Attorney, Agent, or Firm* — Avery N. Goldstein; Blue Filament Law

(57) ABSTRACT

An interface for a single network point that provides channels of content and services to a subscribing user while maintaining the functionality of the channels of content as separate entities. Channels of content and services include, but are not limited to audio and video via cable and broadcast over the air, satellite broadcasts, cell phone service, GPS, Internet, and voice over Internet Protocol (VoIP). Content based on context is injected via a switching device between a content provider device, for example cable provider set top box and a projection unit, for example TV. Remote control devices such as a smart phone or mobile communication device, provide a management function and user control with an application resident on the remote control device. A remote control may be configured to select a content channel, store user selection states, project or display computer content onto a TV for web browsing.

12 Claims, 1 Drawing Sheet

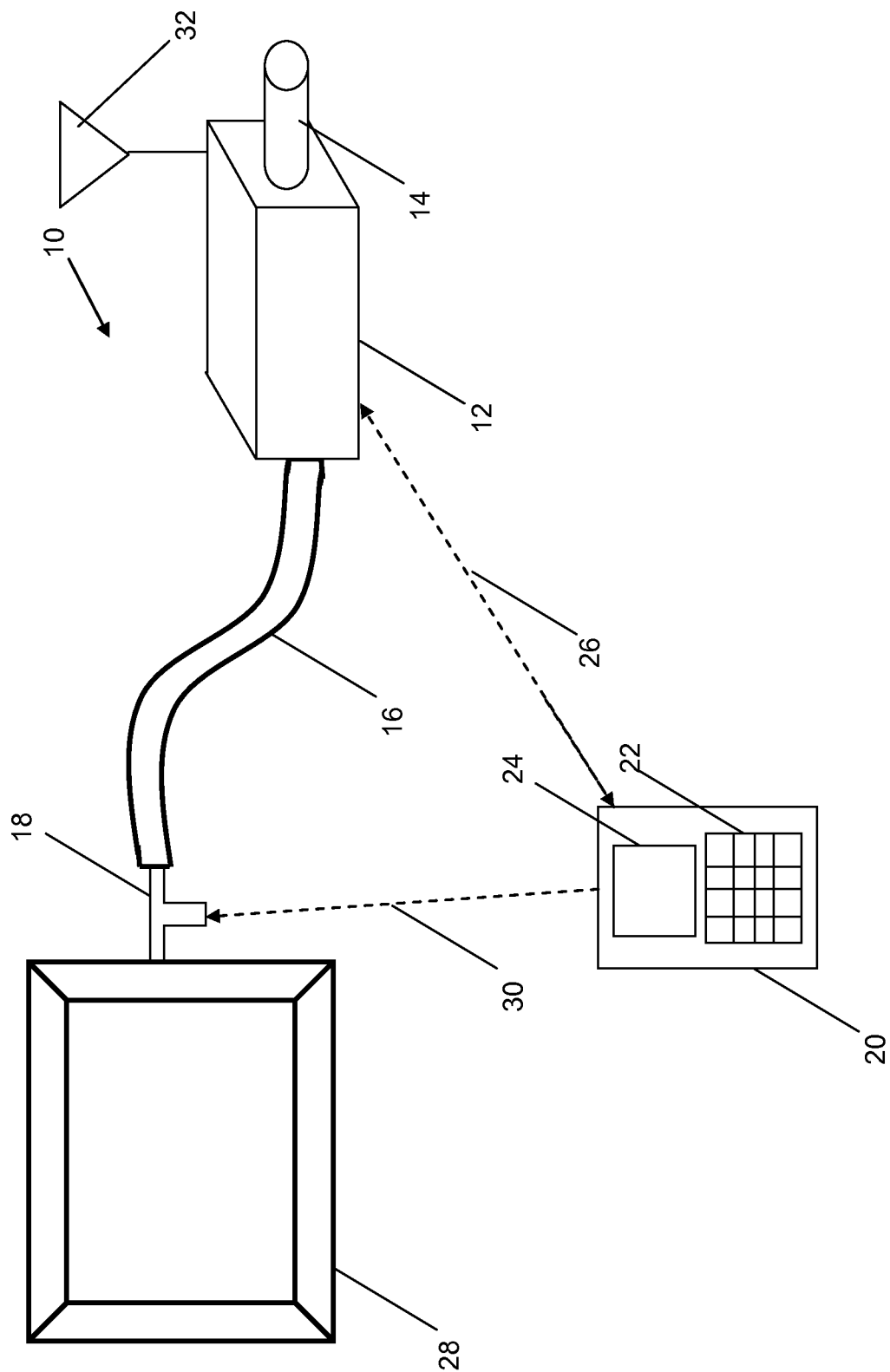

US 9,219,937 B2

UNIVERSAL MULTIPLEXER FOR CONTENT CHANNELS VIA INJECTING

CROSS-REFERENCE TO RELATED APPLICATION

This application claims priority of U.S. Provisional Patent Application Ser. No. 61/750,910 filed Jan. 10, 2013, which is incorporated herein by reference.

FIELD OF THE INVENTION

The present invention in general relates to multimedia electronics and communications and method and systems thereof, and in particular to a multimedia device for integrating communication and multimedia content on a display device.

BACKGROUND OF THE INVENTION

Currently there are many channels of content which are provided to users such as audio and video via cable and broadcast over the air, satellite broadcasts, cell phone service, GPS, Internet, voice over Internet Protocol (VoIP) they are largely not integrated Thus, there exists a need for a method and system for integrating various multimedia content channels for a subscriber's use.

SUMMARY OF THE INVENTION

An inventive method and system that provides an interface for a single network point where all channels of content and services are received and provided to a subscribing user while maintaining the functionality of the channels of content as separate entities. Channels of content and services include but are not limited to audio and video via cable and broadcast over the air, satellite broadcasts, cell phone service, GPS, Internet, and voice over Internet Protocol (VoIP). In an embodiment, a cable service provider injects content based on context via a switching device between a content provider device, for example a cable provider set top box and a projection unit, for example TV. The injection of content may have a physical embodiment of a wire adaptor and have rudimentary routing capability so it is possible to add a remote device to this newly created network which could serve as remote control. An example of a remote control device could be a smart phone or mobile communication device, where a management function and user control is provided by an application resident on the remote control device. A remote control may be configured to select a content channel, store user selection states, project or display computer content onto a TV for web browsing.

BRIEF DESCRIPTION OF THE DRAWINGS

FIG. 1 illustrates a block diagram of a system for integrating various multimedia content channels for a subscriber's use according to an embodiment of the invention.

DESCRIPTION OF THE INVENTION

An inventive method and system that provides an interface for a single network point where all channels of content and services are received and provided to a subscribing user while maintaining the functionality of the channels of content as separate entities. Channels of content and services include but are not limited to audio and video via cable and broadcast over the air, satellite broadcasts, cell phone service, and global positioning satellite (GPS), Internet, and voice over Internet Protocol (VoIP). In an embodiment, a cable service provider injects content based on context via a switching device between a content provider device, for example cable provider set top box and a projection unit, for example TV. In an embodiment, injection of content could have a physical embodiment of a wire adaptor and could have rudimentary routing capability so it is possible to add a remote device to this newly created network which could serve as remote control. An example of a remote control device could be a smart phone or mobile communication device, where a management function and user control is provided by an application resident on the remote control device. In an embodiment, a remote control can be configured to select a content channel, store user selection states, project or display computer content onto a TV for web browsing.

In embodiments, a subscriber can select a current content stream and message the content stream to another subscriber, where the message would be instantaneous since the message would only contain a pointer. The pointer may be in the form of a channel/URL (universal resource locator) plus point of time, such as the time of broadcast since beginning of the movie, if the content is URL based. The subscriber receiving the message would pull content from content provider using their cable box and management device. In an embodiment, the same messaging concept could apply for social network profiles. Furthermore, message metadata and user activity could be tracked for ratings and other purposes.

In an embodiment, a cable service could provide multiple channels for voice or data networks as well creating a roaming network for cell users that subscribe to the cable service. In an embodiment, the roaming network may be fully secured via secure sockets layer (SSL) tunnels, where ensuring quality of service is performed by the managing device.

In an embodiment, a subscriber may switch cable and Internet content by clicking on a hyperlink which is embedded in the cable content or by a general switch and is switched to a website or web based content based on the current video cable content context. For example, a subscriber may be logged onto an online store, or given map directions based on the subscriber's GPS location to the closest location to purchase a related product.

The concept of switching cable and Internet content by clicking on a hyperlink which is embedded in the cable content may be integrated with and is an extension of a bifurcated operating system that is the subject of U.S. patent application Ser. No. 13/493,88 filed on Jun. 11, 2012 entitled "Operating System", herein incorporated by reference in its entirety. Bifurcation is the combining of two operating systems (OS) called a host and a guest. The host OS is hardware based and generates a virtual machine program that runs the guest OS. The guest OS is the user interface level, and handles every user instruction and productivity programs such as word processors, spreadsheets, presentation software, and Web browser. While the user is unaware of the host OS existence, every process goes through the host OS. The host OS is a static structure that is preinstalled in the operating hardware as read only. All updates that a user does are saved as added layers on top of the original settings of the host OS. On system restart, the hardware loads the host OS as originally preinstalled, and the update layers are then applied over the original host OS. An algorithm identifies redundancies in the update layers and consolidates them. If malware is loaded on to a computer, the system automatically restores itself deleting the one or more update layers containing the malware. The bifurcated OS provides a secure computer system that does not require user-initiated system software maintenance. Systems utilizing a bifurcated OS could be transferred to single computer processing circuit and used with various user output/display devices such as those described above. Furthermore devices that utilize the bifurcated OS model may be miniaturized, using miniaturization technology (such as nano technology), combined and embedded for specialized uses. Specifically two embodiments, a bifurcated operating system comprised of a host and guest operating systems via a network interface, and the ability for a secure operating system to be embedded into a casing which would project on a display device such as TV. The concept explained above may be implemented with an injection device that contains a computer or system on a chip, which is also described in U.S. patent application Ser. No. 13/493,88 filed on Jun. 11, 2012 entitled "Operating System", herein incorporated by reference in its entirety. There are security advantages to the overall conceptual design since user content and the controlling operating system are physically and logically separated and therefore a controlling device cannot be compromised by outside security attacks via a content provider network. A computer which would project content onto a TV could also be protected because an image of Web browsing software/operating system could be refreshed by the controlling device.

The increased level of operating security, from man in the middle, spyware, malware, phishing, and other illicit attacks on user devices, through the use of a bifurcation lend itself not only to adding just richness from a content aggregation point of view, but provides new devices, with novel functions applicable to e-commerce. In addition, potential data leaks a prevented through an anti-bridging policy. A current weakness of e-commerce is the weak level of authentication of both client and vendor which stops many consumers from wider acceptance of the use of electronic transactions because of fear of stolen identity. Hardware bifurcation serves a triple function of: 1) providing additional factors in authentication (distributing authentication through multiple authentication channels, using the static location of hardware component as an actor in authentication, monitoring movement of purchaser, ability to complete transaction in store); 2) bifurcating/distributing a transaction, for example a user could initiate as an e-transaction and complete as in-store transaction, which could solve the problem of caching credit card information into a phone; and 3) credentials and personal information are protected from malware/phishing from Internet sources since credentials and personal information are not stored in the hardware layer that communicates/interfaces with the Internet.

In the inventive embodiments the bifurcated OS is physically separated either by logical separation of controller and function utility devices, or a [dynamic aggregation of multiple devices hybrid composite device] running a bifurcated OS implementation. In the following two example embodiments of intrinsically secure storage and bring your own device (BYOD), a host OS component is not directly accessible to a user or administrator, and therefore is not subject to an "inside job".

Intrinsically secure storage may be employed in embodiments of the invention. Intrinsically secure storage is exposed by a controlling device and its host insures that on bifurcated client can access storage assets. The client controlling device is constructed in such a way that once the client controlling device connects to a network other than storage, the existing connection to the storage is disconnected, and any data retrieved by the client guest OS from storage is cleared or wiped by a client OS refresh. This method of intrinsically secure storage would allow a government to deposit sensitive data onto a storage device from which data cannot be leaked even due to an "inside job".

Embodiments of the invention also offer forms of security for client usage of bring your own device (BYOD) on secure or private networks. BYOD (also called bring your own technology (BYOT), bring your own phone (BYOP), and bring your own PC (BYOPC)) refers to the policy of permitting employees to bring personally owned mobile devices (laptops, tablets, and smart phones) to their workplace, and to use those devices to access privileged company information and applications. In an embodiment of the invention, security protection for allowing the use of BYOD devices (which could be a multi-media device) may be with a network switch controller that detects a connection request from a client BYOD device and provides it virtual host for connecting the BYOD device. An example of an invocation method used in embodiments of the invention could be a preboot execution environment (PXE boot). A PXE is an environment to boot computers using a network interface independently of data storage devices (like hard disks) or installed operating systems. This on-demand virtual host (which is the host OS portion of distributed bifurcated OS) would manage network security policy for the prevention of man in the middle, spyware, malware, phishing, data leaks, and other illicit attacks. An embodiment of a controlling device may be a smart phone or portable communication and computing device, which would have a user interface keyboard and its own independent secure e-mailing capability, GPS subsystem, and video editing software. The controlling device would physically fit in the hand like a regular dedicated device remote control, plus inventive controlling device would provide for multi-tasking and parallel phone service via direct cell connection or voice over IP. Embodiments of the controlling device may also serve as smart Internet filter, and provide substitutes for content which deemed to be inappropriate or for external advertisements.

Embodiments of the controlling device may offer a user an enhanced channel browsing experience. Instead of regular channel browsing one by one, a user could be provided with channel browsing based on their unique metadata and browsing habits. Embodiments of the controller device could make content dynamically tailored. For example, if there is an indication that consumer dislikes something like a fragment of a political ad, this disliked context or content would be deleted from future feeds, and demographic information would be provided to a political campaign.

In embodiments, content channels may be automatically generated based on user favorability and interest statistics, where video, images that are generated by users and actively messaged/shared would be uploaded to the content channel of a content provider, where proper filtering would be applied to the user generated content prior to rebroadcast. For example, these user generated content channels may be real time feeds for world events. An additional example may be a composite channel for the Olympics that is compiled based on interest of viewers of the specialized channels.

In embodiments, the combining of content provider service with a management device, which has its own add-on features as described above, provide for synergy affects because it is possible either to switch between different channels and the web browser and patterns can be observed based on a user's behavior. For example, when a user sends video e-mail, the use of the video email feature may be interpreted as a preferred feature for this user, and could improve the quality ratings for various user types and make advertisement more tailored to what user likes and dislikes. The advertisement could be swapped on demand. In embodiments, there could be integration with e-commerce by notifying a store that a user is interested in a product sold by the store. A GPS map may be created for a user to drive to the store, and the store may be notified to bring the product to the front desk for pickup. Furthermore, a store floor plan map may be generated with a location for the user to find the product in the store, such as by row and isle, and could be added to the GPS map. Product purchase locations, prices, inventory counts, product pictures could be passively tracked for the benefit of future users. The control device could be used as consumer identification and as a credit card. A participating retail location or store could have cable service and free cell phone coverage could be provided specifically for paying consumers. A content provider or control device provider could earn a portion of the transaction cost.

Referring now to the FIGURE, FIG. 1 illustrates a system 10 for integrating various multimedia content channels for a subscriber's use. A cable set top box/router 12 receives content via input cable 14 cable or wireless signal via an antenna 32 from a content provider. The set top box/router 12 outputs processed content that is formatted for the display device 28, such as a television, computer monitor, portable computing device, phone display, headgear display, etc. via a cable 16 or wireless signal 26. The set top box/router 12 may provide a split channel for VoIP as shown with wireless signal 26. Remote device 20 with keyboard 22 and display 24 communicates via a wireless signal 30 (or wired signal (not shown)) to a signal interceptor/injector 18 that acts as a context switching device between content provider device, for example the cable provider box 12 and a projection or display unit, for example a TV 28.

The foregoing description is illustrative of particular embodiments of the invention, but is not meant to be a limitation upon the practice thereof. The following claims, including all equivalents thereof, are intended to define the scope of the invention.

The invention claimed is:

1. A system for integrating various multimedia content channels and services for a subscriber's use, said system comprising:
    a cable set top box/router that receives content and services via an input cable or wireless signal via an antenna from a content provider;
    an output cable from said cable set top box/router in electrical contact with a display device;
    a remote control device with a keyboard and a display that communicates via a wireless or wired signal with a signal interceptor/injector;
    a bifurcated operating system (OS);
    wherein said signal interceptor/injector acts as a context switching device between said cable set top box/router and said display device;
    wherein said remote control device and said interceptor/injection device further comprises a computer or system on a chip that operates with said bifurcated OS;
    wherein said bifurcated OS further comprises a host OS that is read only and hardware based and generates a virtual machine program that runs a guest OS, where the guest OS provides a user interface level, and the guest OS handles user instructions, a set of productivity programs, and a Web browser; and
    wherein user based updates are saved as added update layers on top of the host OS, and on system restart, the hardware loads the host OS, and the update layers are then applied over the host OS, where if an error or forms of illicit attacks are discovered in one or more of the update layers the system automatically restores itself with the deletion of the one or more update layers containing the error or forms of illicit attacks.

2. The system of claim 1 wherein said content and services further comprises one or more of audio and video via cable and broadcast over the air, satellite broadcasts, cell phone service, global position satellite (GPS), Internet, and voice over Internet Protocol (VoIP).

3. The system of claim 2 wherein said cell phone service is provided over a roaming network available to subscribers to said content provider; and
    wherein said roaming network is secured via secure sockets layer (SSL) tunnels, where ensuring quality of service is performed by a management function on said remote control device.

4. The system of claim 1 wherein said remote control device is configured to select a content channel, store user selection states, project or display computer content onto a TV for web browsing.

5. The system of claim 4 wherein said remote control device is configured for a selected content channel to be streamed or messaged; and
    wherein said stream or message is instantaneous since the message only contains a pointer.

6. The system of claim 4 wherein said pointer is in the form of a channel/URL (universal resource locator) plus point of time.

7. The system of claim 4 wherein metadata associated with said messages and said subscriber's activity is tracked for ratings.

8. The system of claim 1 wherein said remote control device is a smart phone or a portable communication and computing device.

9. The system of claim 1 wherein said bifurcated operating system (OS) is not directly accessible to a user or administrator.

10. The system of claim 1 wherein said remote control is a bring your own device (BYOD).

11. The system of claim 1 further comprising intrinsically secure storage, wherein once said remote control device connects to a network other than said intrinsically secure storage, an existing connection to said intrinsically secure storage is disconnected, and any data retrieved by said remote control device from said intrinsically secure storage is cleared or wiped.

12. The system of claim 1 wherein said bifurcated OS is physically separated either by logical separation of said remote control device and function utility devices, or a [dynamic aggregation of multiple devices hybrid composite device] running a bifurcated OS implementation.

* * * * *